(12) United States Patent  
Wang et al.

(10) Patent No.: US 9,288,481 B2
(45) Date of Patent: Mar. 15, 2016

(54) STEREOSCOPIC DISPLAY METHOD

(71) Applicant: AU Optronics Corporation, Hsin-Chu (TW)

(72) Inventors: Chih-Chieh Wang, Hsin-Chu (TW); Cheng-Pim Ku, Hsin-Chu (TW); Li-Hsuan Lin, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 232 days.

(21) Appl. No.: 14/249,731

(22) Filed: Apr. 10, 2014

(65) Prior Publication Data
US 2015/0198814 A1    Jul. 16, 2015

(30) Foreign Application Priority Data

Jan. 10, 2014 (TW) .............................. 103101003 A

(51) Int. Cl.
G02B 27/22    (2006.01)
H04N 13/04    (2006.01)
G06F 3/01     (2006.01)
H04N 13/00    (2006.01)
G02B 27/00    (2006.01)

(52) U.S. Cl.
CPC ........ H04N 13/0409 (2013.01); G02B 27/0093 (2013.01); G02B 27/22 (2013.01); G06F 3/013 (2013.01); H04N 13/0018 (2013.01); H04N 13/0477 (2013.01)

(58) Field of Classification Search
CPC .. G02B 7/2214; G02B 27/0093; G02B 27/22; G06F 3/013; H04N 13/0409; H04N 13/0477; H04N 13/0018

USPC .......................................................... 348/54
See application file for complete search history.

(56) References Cited

U.S. PATENT DOCUMENTS

| 2003/0107804 | A1* | 6/2003 | Dolgoff ............. | G02B 27/2214 359/463 |
| 2008/0117231 | A1* | 5/2008 | Kimpe ..................... | G09G 3/20 345/629 |
| 2010/0265160 | A1  | 10/2010 | Hajjar | |
| 2012/0249746 | A1* | 10/2012 | Cornog ............. | H04N 13/0022 348/47 |
| 2013/0093646 | A1* | 4/2013 | Curtis .................... | G06F 3/1446 345/1.3 |
| 2013/0093647 | A1  | 4/2013 | Curtis et al. | |

FOREIGN PATENT DOCUMENTS

CN    101958111       1/2011
TW    M450917 U1     4/2013

* cited by examiner

Primary Examiner — Hee-Yong Kim
(74) Attorney, Agent, or Firm — WPAT, PC; Justin King

(57) ABSTRACT

A stereoscopic display method includes the following acts. A plurality of stereoscopic images are provided by providing a plurality of stereoscopic display panels. At least one border is disposed between two of the stereoscopic display panels adjacent to each other. At least one stripe segment is added in each of the stereoscopic images. The stripe segments are adjacent to the border, such that the stripe segments and the border form a floating frame when an observer observes the stripe segments and the border using both eyes of the observer. A width of each of the stripe segments is adjusted, such that a depth of field of the floating frame is substantially the same as a depth of field of the stereoscopic images adjacent to the floating frame.

13 Claims, 8 Drawing Sheets

STEREOSCOPIC DISPLAY METHOD

RELATED APPLICATIONS

This application claims priority to Taiwan Application Serial Number 103101003, filed Jan. 10, 2014, which is herein incorporated by reference.

BACKGROUND

1. Field of Invention

The present invention relates to a stereoscopic display method.

2. Description of Related Art

Typically, in order to achieve large frame stereoscopic display, a plurality of stereoscopic display panels are assembled into a video wall. Large frame stereoscopic images are thus constituted by individual stereoscopic image provided by each of the stereoscopic display panels.

However, each of the stereoscopic display panels has a border. In other words, borders exist between any of the two stereoscopic display panels adjacent to each other. Since a stereoscopic image cannot be generated at the border, a depth of field of the large frame stereoscopic image provided by the video wall at the borders is not allowed to be adjusted. Because the border does not have an embossed effect, observers may probably feel uncomfortable due to the error depth of field caused by the borders when the stereoscopic images near the borders emerge above display surfaces of the stereoscopic display panels.

SUMMARY

A stereoscopic display method is provided. The stereoscopic display method includes the following acts (it should be understood that the order of the acts described in the present embodiment, unless otherwise specified, may be changed as required, or the acts or part of the acts may be performed simultaneously):

(1) Providing a plurality of stereoscopic images by providing a plurality of stereoscopic display panels. At least one border is disposed between two of the stereoscopic display panels adjacent to each other.

(2) Adding at least one stripe segment in each of the stereoscopic images. The stripe segments are adjacent to the border such that the stripe segments and the border form a floating frame when an observer observes the stripe segments and the border using both eyes of the observer.

(3) Adjusting a width of each of the stripe segments such that a depth of field of the floating frame is substantially the same as a depth of field of the stereoscopic images adjacent to the floating frame.

In one or more embodiments, the width of each of the stripe segments substantially satisfies:

$$W = \frac{xI}{D-x},$$

where W denotes the width of each of the stripe segments, x denotes the depth of field of the stereoscopic images adjacent to the border, I denotes a distance between the both eyes of the observer, and D denotes a vertical distance between the both eyes of the observer and the stereoscopic display panels.

In one or more embodiments, the border at least includes a first portion and a second portion. Each of the stripe segments includes a first sub stripe segment and a second sub stripe segment. The first sub stripe segments are adjacent to the first portion of the border. The second sub stripe segments are adjacent to the second portion of the border. Each of the stereoscopic images includes a first part and a second part. When the observer observes the first sub stripe segments and the first portion of the border using the both eyes of the observer, the first sub stripe segments and the first portion of the border form a first sub floating frame. When the observer observes the second sub stripe segments and the second portion of the border using the both eyes of the observer, the second sub stripe segments and the second portion of the border form a second sub floating frame. The first sub floating frame and the second sub floating frame form the floating frame. The first parts of the stereoscopic images are adjacent to the first sub floating frame, and the second parts of the stereoscopic images are adjacent to the second sub floating frame. The above-mentioned act (3) includes the following acts:

(3.1) Adjusting a width of each of the first sub stripe segments such that a depth of field of the first sub floating frame is the same as a depth of field of the first parts of the stereoscopic images.

(3.2) Adjusting a width of each of the second sub stripe segments such that a depth of field of the second sub floating frame is the same as a depth of field of the second parts of the stereoscopic images.

In one or more embodiments, the width of each of the first sub stripe segments is different from the width of each of the second sub stripe segments.

In one or more embodiments, the stereoscopic display method further includes the following act:

(4) Cancelling the stripe segment in each of the stereoscopic images when the depth of field of the stereoscopic images adjacent to the floating frame is located on a rear side of the stereoscopic display panels opposite to the both eyes of the observer.

In one or more embodiments, a displayed color of each of the stripe segments is substantially the same as a color of the border.

In one or more embodiments, the above-mentioned act (2) includes the following act:

(2.1) Adding the plurality of stripe segments adjacent to each other in each of the stereoscopic images.

In one or more embodiments, the above-mentioned act (2) further includes the following act:

(2.2) Adjusting a displayed color of each of the stripe segments.

The displayed color is made by mixing a color of the border and an image color of the stereoscopic image adjacent to each of the stripe segments.

In one or more embodiments, the displayed color of each of the two stripe segments adjacent to each other is different from each other.

In one or more embodiments, the farther the distance between each of the stripe segments and the border is, the greater the weight of the image color is for the displayed colors of the different stripe segments.

In one or more embodiments, a number of the stripe segments in each of the stereoscopic images is the same.

In one or more embodiments, the stereoscopic display method further includes:

(5) Detecting a distance between the both eyes of the observer and a vertical distance between the both eyes of the observer and the stereoscopic display panels.

(6) Adjusting the width of each of the stripe segments on two opposite sides of the border based on the distance between the both eyes of the observer and the vertical distance between the both eyes of the observer and the stereoscopic display panels.

In one or more embodiments, the stereoscopic display further includes the following acts:

(7) Detecting viewing zones where the both eyes of the observer are located.

(8) Adjusting the width of each of the stripe segments on two opposite sides of the border respectively based on the viewing zones where the both eyes of the observer are located.

DESCRIPTION OF THE EMBODIMENTS

Figure 1:
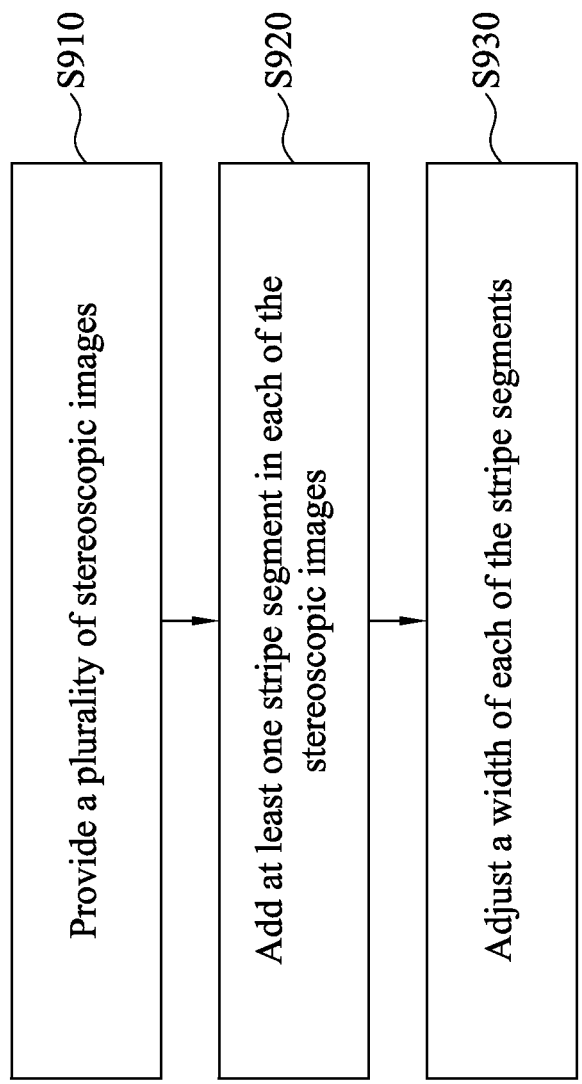
FIG. 1 is a flowchart of a stereoscopic display method according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

Figure 2:
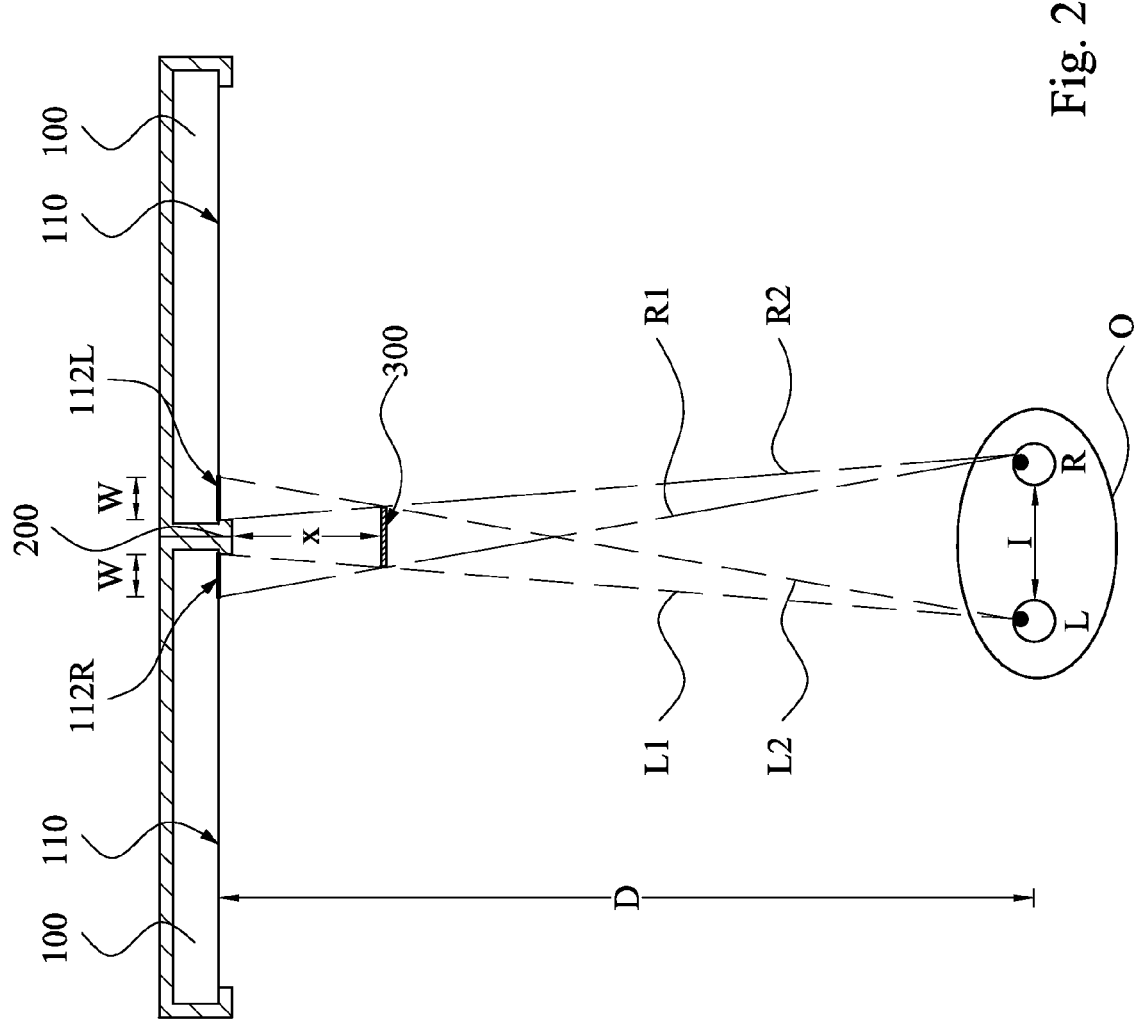
FIG. 2 is a schematic diagram of a stereoscopic display utilizing the stereoscopic display method in FIG. 1 in one display state.

FIG. 1 is a flowchart of a stereoscopic display method according to one embodiment of this invention. FIG. 2 is a schematic diagram of a stereoscopic display utilizing the stereoscopic display method in FIG. 1 in one display state. As shown in the figures, the present embodiment stereoscopic display method includes the following acts (it should be understood that the order of the acts described in the present embodiment, unless otherwise specified, may be changed as required, or the acts or part of the acts may be performed simultaneously):

Act S910: Provide a plurality of stereoscopic images 110 by providing a plurality of stereoscopic display panels 100. At least one border 200 is disposed between two of the stereoscopic display panels 100 adjacent to each other. For example, the stereoscopic display in FIG. 2 includes the two stereoscopic display panels 100. The border 200 is disposed between the two stereoscopic display panels 100, and the two stereoscopic display panels 100 provide the two stereoscopic images 110.

Act S920: Add at least one stripe segment 112L (or 112R) in each of the stereoscopic images 110. The stripe segments 112R and 112R are adjacent to the border 200, such that the stripe segments 112L, 112R and the border 200 form a floating frame 300 when an observer O observes the stripe segments 112L, 112R and the border 200 using both eyes L and R of the observer O.

Act S930: Adjust a width W of each of the stripe segments 112L and 112R, such that a depth of field x of the floating frame 300 is substantially the same as a depth of field of the stereoscopic images 110 adjacent to the floating frame 300.

Briefly speaking, the stereoscopic display method of the present embodiment can generate the floating frame 300. Since the floating frame 300 has the depth of field x, and the depth of field x is substantially the same as the depth of field of the stereoscopic images 110 adjacent to the floating frame 300, the observer O can experience that the floating frame 300 and the stereoscopic images 110 are substantially connected so as to achieve large frame stereoscopic images with smoothly connected images. The discomfort due to the error depth of field caused by the border 200 is thus reduced when the observer O observes the stereoscopic images 110.

In order to have the depth of field x of the floating frame 300 be substantially the same as the depth of field of the stereoscopic images 110 adjacent to the floating frame 300, the width W of the stripe segments 112R and 112R substantially satisfies:

$$W = \frac{xI}{D-x},$$

where W denotes the width of each of the stripe segments 112L and 112R, x denotes the depth of field of the stereoscopic images 110 adjacent to the border 200 (that is substantially the depth of field of the floating frame 300), I denotes a distance between the both eyes L and R of the observer O, and D denotes a vertical distance between the both eyes L and R of the observer O and the stereoscopic display panels 100.

In greater detail, when the observer O is located directly in front of the border 200, the border 200 and the stripe segment 112L form a left-eye image of the floating frame 300 for the left eye L of the observer O, and a view angle of the left-eye image of the floating frame 300 is between a line segment L1 and a line segment L2. For the right eye R of the observer, the border 200 and the stripe segment 112R form a right-eye image of the floating frame 300, and a view angle of the right-eye image of the floating frame 300 is between a line segment R1 and a line segment R2. Hence, the width W of the stripe segment 112L can be determined based on the two triangles formed by the line segments L2 and R2. According to similar triangle law, it is obtained:

$$\frac{x}{W} = \frac{D-x}{I},$$

Hence, $$W = \frac{xI}{D-x}.$$

Similarly, the width W of the stripe segment 112R can be determined based on the two triangles formed by the line segments L1 and R1, and the width $$W = \frac{xI}{D-x}.$$

In one or more embodiments, a displayed color of each of the stripe segments 112L and 112R is substantially the same as a color of the border 200. For example, if the color of the border 200 is black, the displayed color of the stripe segments 112L and 112R may be black, but the claimed scope of the present invention is not limited in this regard. Therefore, the stripe segments 112L and 112R are substantially merged into the border 200. For the left eye L of the observer O, the stripe segment 112L can be regarded as one portion of the border 200. For the right eye R of the observer O, the stripe segment 112R can be regarded as one portion of the border 200. As a result, the observer O can experience that the floating frame 300 has the depth of field x.

Figure 3:
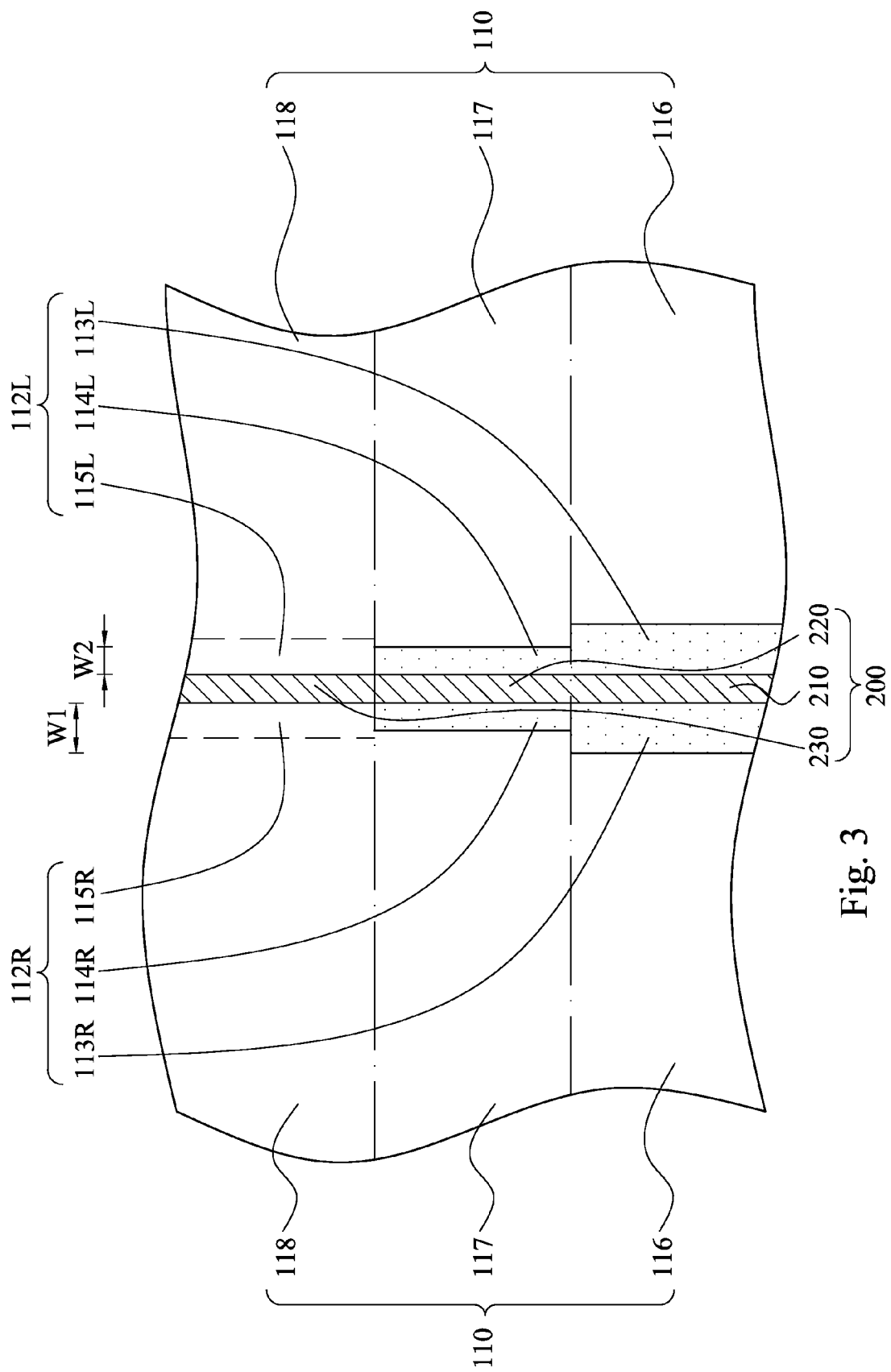
FIG. 3 is a partially top view of the stereoscopic display in FIG. 2 in another display state.
Figure 4:
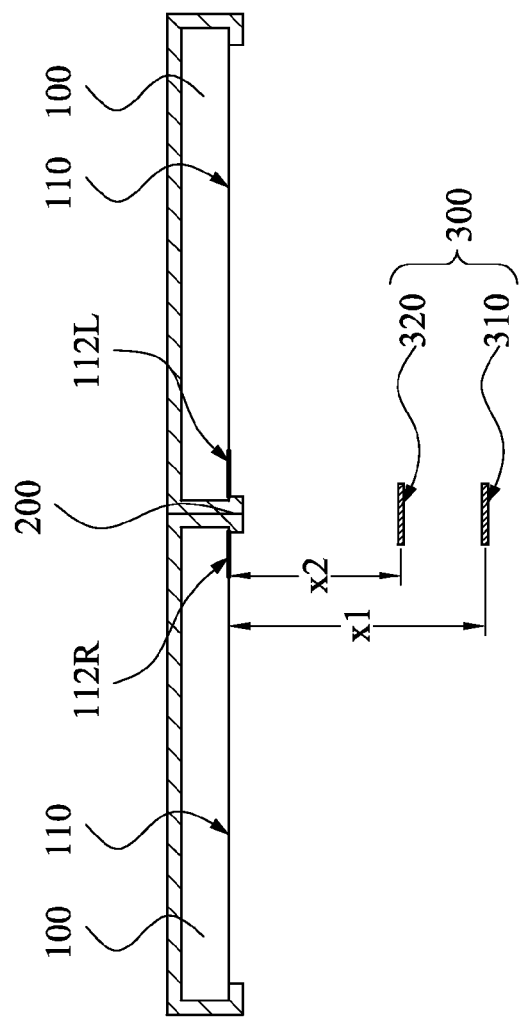
FIG. 4 is a top view of the stereoscopic display in FIG. 3 and an observer.
Figure 4:
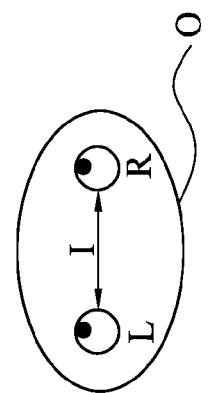

FIG. 3 is a partially top view of the stereoscopic display in FIG. 2 in another display state. FIG. 4 is a top view of the stereoscopic display in FIG. 3 and an observer O. According to the present embodiment, the border 200 includes a first portion 210 and a second portion 220. The stripe segment 112L (or 112R) includes a first sub stripe segment 113L (or 113R) and a second sub stripe segment 114L (or 114R). The first sub stripe segments 113L and 113R are adjacent to the first portion 210 of the border 200. The second sub stripe segments 114L and 114R are adjacent to the second portion 220 of the border 200. Each of the stereoscopic images 110 includes a first part 116 and a second part 117.

When the observer O observes the first sub stripe segments 113L, 113R and the first portion 210 of the border 200 using the both eyes L and R of the observer O, the first sub stripe segments 113L, 113R and the first portion 210 of the border 200 form a first sub floating frame 310. When the observer O observes the second sub stripe segments 114L, 114R and the second portion 220 of the border 200 using the both eyes L and R of the observer O, the second sub stripe segments 114L, 114R and the second portion 220 of the border 200 form a second sub floating frame 320. The first sub floating frame 310 and the second sub floating frame 320 form the floating frame 300. The first parts 116 of the stereoscopic images 110 are adjacent to the first sub floating frame 310. The second parts 117 of the stereoscopic images 110 are adjacent to the second sub floating frame 320.

In greater detail, the first parts 116 of the stereoscopic images 110 have, for example, a depth of field x1. The second parts 117 have, for example, a depth of field x2. Hence, the width of each of the stripe segments 112L and 112R can be adjusted based on the above depths of field. Detailed adjustment acts are as follows:

(3.1) Adjust a width W1 of each of the first sub stripe segments 113L and 113R such that a depth of field of the first sub floating frame 310 is the same as the depth of field x1 of the first parts 116 of the stereoscopic images 110.

(3.2) Adjust a width W2 of each of the second sub stripe segments 114L and 114R such that a depth of field of the second sub floating frame 320 is the same as the depth of field x2 of the second parts 117 of the stereoscopic images 110.

Hence, when the depth of field x1 of the first parts 116 is different from the depth of field x2 of the second parts 117, the width W1 of each of the first sub stripe segments 113L and 113R is different from the width W2 of each of the second sub stripe segments 114L and 114R. Therefore, the observer O can experience that the first sub floating frame 310 (generated by the first portion 210 of the border 200 and the first sub stripe segments 113L and 113R) of the floating frame 300 has the depth of field x1, and the second sub floating frame 320 (generated by the second portion 220 of the border 200 and the second sub stripe segments 114L and 114R) of the floating frame 300 has the depth of field x2. It is noted that although the first parts 116 and the second parts 117 serve as an example for explanation of aspects of the present invention, the claimed scope of the present invention is not limited in this regard. In other embodiments, the number of parts in each of the stereoscopic images 110 may be determined based on the number of depths of field that each of the stereoscopic images 110 adjacent to the border has. In other words, when the depth of field of the stereoscopic image 110 adjacent to the border 200 changes along the extension direction of the border 200, the stereoscopic image 110 may be divided into a plurality of parts based on the different depths of field. In addition, each of the stripe segments 112L and 112R may be divided into a plurality of sub stripe segments corresponding to the plurality of the parts, and a width of each of the different sub stripe segments may be adjusted based on the depth of field that the adjacent part has.

In other embodiments, the border 200 may further include a third portion 230, and the stripe segment 112L (or 112R) includes a third sub stripe segment 115L (or 115R). The third sub stripe segments 115L and 115R are adjacent to the third portion 230 of the border 200. Each of the stereoscopic images 110 further includes a third part 118, and a depth of field of the third part 118 is located on a rear side of the stereoscopic display panel 100 opposite to the both eyes L and R of the observer O, that is, in the back of the stereoscopic display panel 100. In other words, the third part 118 of each of the stereoscopic images 110 does not emboss above the stereoscopic display panel 100. Hence, it is not necessary to create an embossed effect for the third portion 230 or the border 200. Under the circumstances, the stereoscopic display method may further include the following act:

(4) When the depth of field of the stereoscopic images 110 adjacent to the floating frame 300 is located on the rear side of the stereoscopic display panels 100 opposite to the both eyes L and R of the observer O, cancel the stripe segments 112L and 112R of each of the stereoscopic images 110. For example, in the present embodiment, the third sub stripe segments 115L and 115R may be cancelled such that the third portion 230 of the border 200 does not have the embossed effect.

It should be noted that although in the above description only the third sub stripe segments 115L and 115R of the stripe segments 112L and 112R are cancelled, in other embodiments, the whole stripe segments 112L and 112R may be cancelled if the depths of field of the stereoscopic images 110 adjacent to the stripe segments 112L and 112R are all located on the rear side of the stereoscopic display panels 100 opposite to the both eyes L and R of the observer O.

Figure 5A:
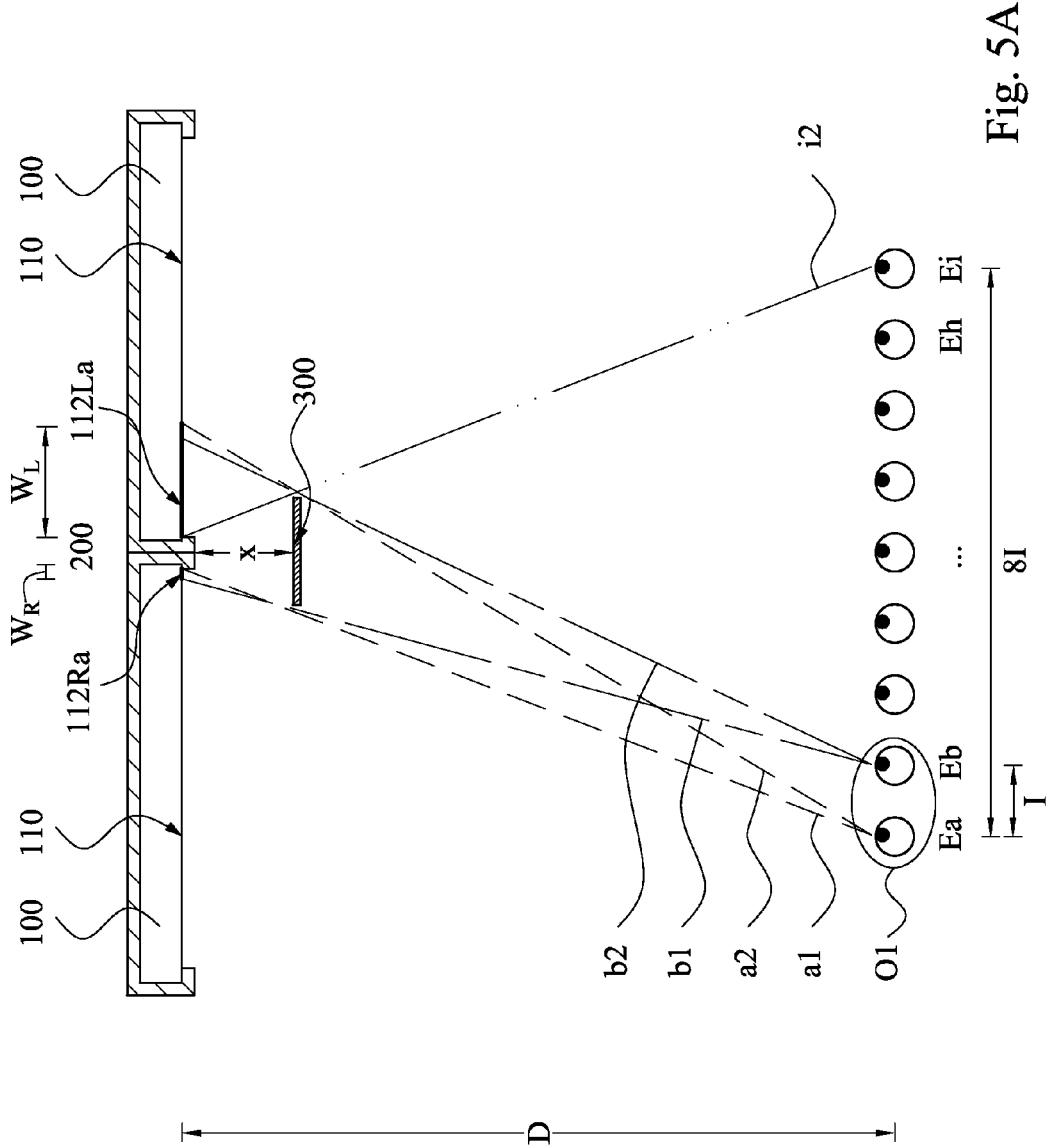
FIG. 5A and FIG. 5B are schematic diagrams of the stereoscopic display utilizing the stereoscopic display method in FIG. 1 in still another two display states.
Figure 5B:
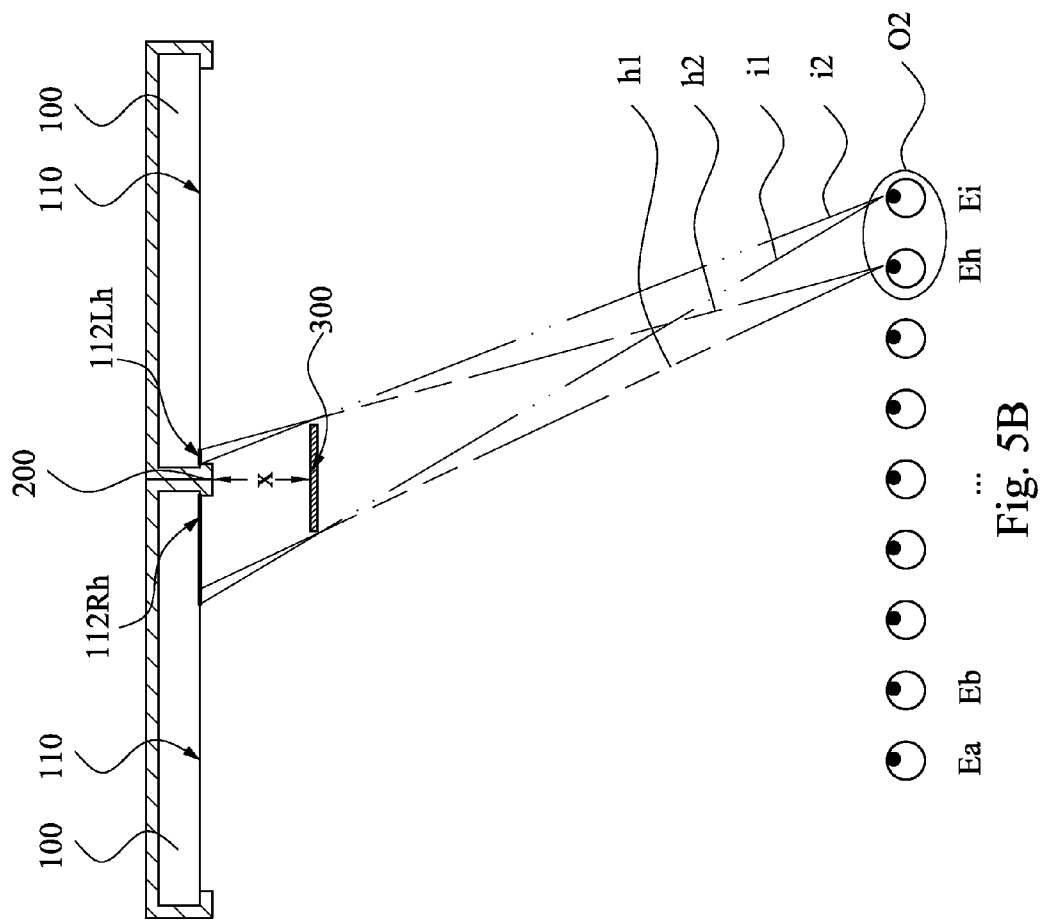

In the above paragraphs, two viewing zones (respectively corresponds to the left eye L and the right eye R) serve as an example for explanation of aspects of the present invention. However, in other embodiments, the stereoscopic display method may also be applied to multi-view stereoscopic display panels 100. FIG. 5A and FIG. 5B are schematic diagrams of a stereoscopic display utilizing the stereoscopic display method in FIG. 1 in still another two display states. In the present embodiment, each of the stereoscopic display panels 100 may provide multi-view images. For example in FIG. 5A and FIG. 5B, two adjacent eyes (Ea and Eb, . . . , Eh and Ei) are respectively located at two viewing zones adjacent to each other. In other words, according to the present embodiment, each of the stereoscopic display panels 100 has nine viewing zones, and the stereoscopic display can provide stripe segments having suitable widths to these viewing zones, respectively. For example, in FIG. 5A, a stripe segment 112La (or 112Ra) may be added in each of the stereoscopic images 110 projected into the viewing zones where the both eyes Ea and Eb of an observer O1 are located. The observer O1 can experience the floating frame 300 when a view angle of the eye Ea is between a line segment a1 and a line segment a2 and a view angle of the eye Eb is between a line segment b1 and a line segment b2. In FIG. 5B, for an observer O2 having the both eyes Eh and Ei, a stripe segment 112Lh (or 112Rh) may be added in each of the stereoscopic images 110 projected into the viewing zones where the both eyes Eh and Ei are located. The observer O2 can experience the floating frame 300 when a view angle of the eye Eh is between a line segment h1 and a line segment h2 and a view angle of the eye Ei is between a line segment i1 and a line segment i2.

With additional reference to FIG. 5A, for the stereoscopic images 110 projected into the viewing zones where the both eyes Ea and Eb are located, widths of the stripe segments 112La and 112Ra are respectively $W_L$ and $W_R$. The depth of field of the stereoscopic images 110 adjacent to the border 200 (that is substantially the depth of field of the floating frame 300) is x. A distance between each of the two eyes is I (that is a distance between the eye Ea and the eye Ei is 8I). Vertical distances between each of the eyes Ea-Ei and the stereoscopic display panels 100 are all D. Therefore, the width $W_L$ of the stripe segment 112La can be determined based on the two triangles formed by the line segments a2 and i2. According to similar triangle law, it is obtained:

$$\frac{x}{W_L} = \frac{D-x}{8I},$$

Hence, $$W_L = \frac{8xI}{D-x}.$$

The width $W_R$ of the stripe segment 112Ra can be determined based on the two triangles formed by the line segments a1 and b1, and the width $$W_R = \frac{xI}{D-x}.$$

Thus, the stripe segment 112La and the stripe segment 112Ra on two opposite sides of the border 200 have the different widths $W_L$ and $W_R$ according to the present embodiment. Since the calculation method of widths of the stripe segments 112Lh and 112Rh in FIG. 5B is the same as that in FIG. 5A, a further description in this regard is not provided.

In summary, in a multi-view stereoscopic display, widths of the stripe segments in each of the stereoscopic images 110 projected into different viewing zones may not be the same. That is, the width of the stripe segment may vary depending on different viewing zones.

Figure 6:
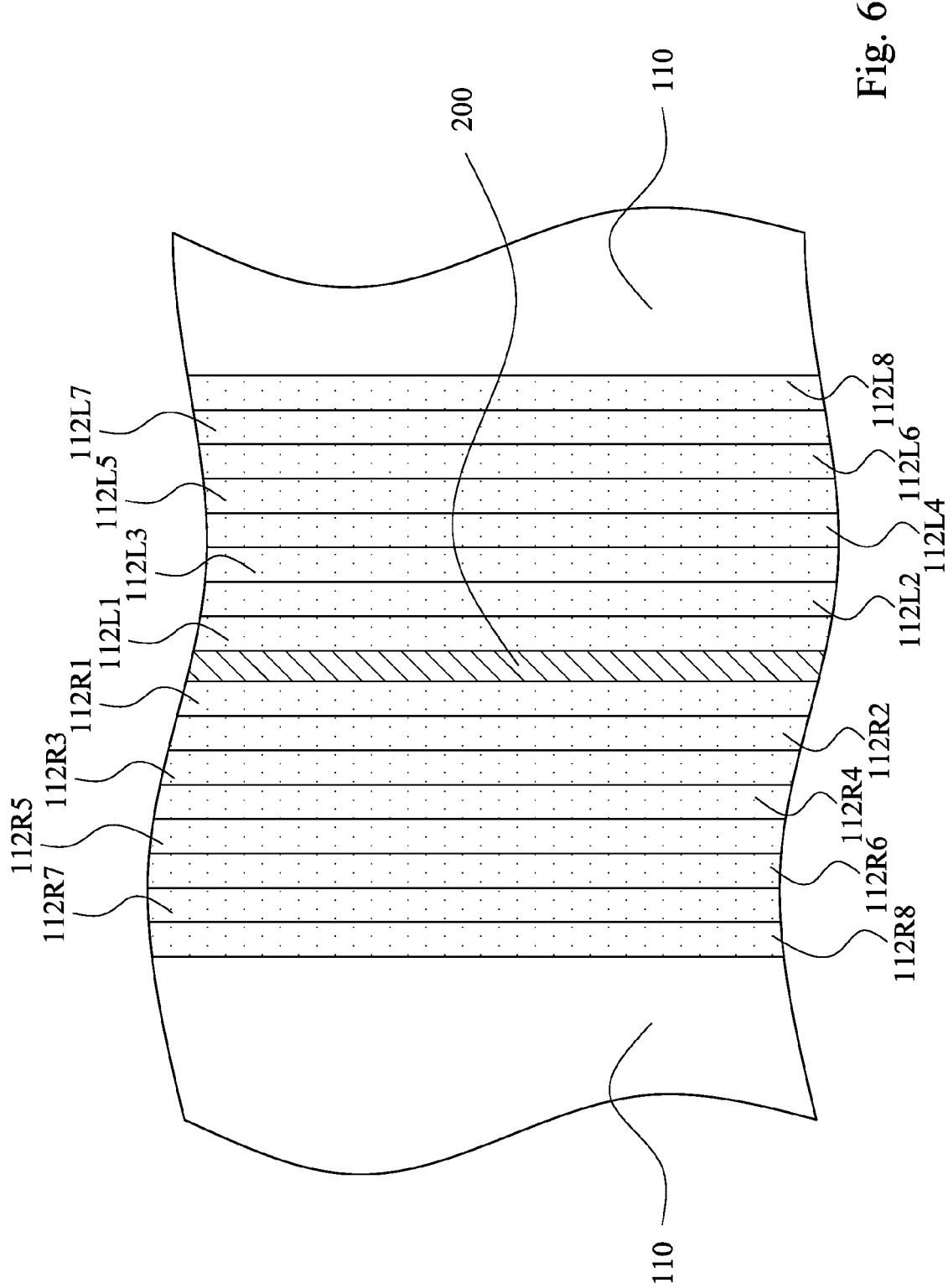
FIG. 6 is a partially top view of the stereoscopic display in FIG. 5A in a display state.

FIG. 6 is a partially top view of the stereoscopic display in FIG. 5A in a display state. In one or more embodiments, the act of adding the stripe segments 112La and 112Ra (see FIG. 5A) includes:

(2.1) Add a plurality of stripe segments adjacent to each other in each of the stereoscopic images 110.

For example in FIG. 6, eight stripe segments 112L1-112L8 and eight stripe segments 112R1-112R8 may be added. It should be noted that the above-mentioned numbers of the stripe segments are shown by way of example, and are not intended to limit the present invention. Those of ordinary skill in the art may determine the numbers of the stripe segments flexibly as required.

As mentioned previously, a displayed color of each of the stripe segments 112La and 112Ra (see FIG. 5A) is substantially the same as the color of the border 200. Hence, even if an observer experiences that the floating frame 300 (see FIG. 5A) has an embossed effect, the observer is also likely to experience that the floating frame 300 blocks the image between the stereoscopic images 110. Thus, in other embodiments, the stripe segments 112L1-112L8 and the stripe segments 112R1-112R8 may serve as color buffers between the border 200 and the stereoscopic images 110, such that the boundaries between the stereoscopic images 110 and the floating frame 300 are not too obvious. As a result, the phenomenon that the floating frame 300 blocks the image is improved so as to lessen the discomfort in the observer. Under the circumstances, the act of adding the stripe segments 112L1-112L8 and the stripe segments 112R1-112R8 may further include:

(2.2) Adjust a displayed color of each of the stripe segments 112L1-112L8 and the stripe segments 112R1-112R8. The display color is made by mixing the color of the border 200 and an image color of the stereoscopic image 110 adjacent to each of the stripe segments 112L1-112L8 and the stripe segments 112R1-112R8.

In other words, since the displayed color of each of the stripe segments 112L1-112L8 and the stripe segments 112R1-112R8 is made by mixing the color of the border 200 and the image color, the boundary of the floating frame 300 is thus blurred. Not only are the boundaries between the stereoscopic images 110 and the floating frame 300 not too obvious, but the observer is also allowed to see the images of the stereoscopic images 110 from part of the floating frame 300 when the floating frame 300 exists.

In one or more embodiments, the displayed color of each of the two stripe segments adjacent to each other is different from each other. For example, the displayed colors of some of the stripe segments are closer to the color of the border 200, and the displayed colors of the other stripe segments are closer to the image colors of the stereoscopic images 110. In one of the embodiments, for the displayed colors of the different stripe segments, the farther the distance between each of the stripe segments and the border 200 is, the greater the weight of the image color is. In greater detail, among the stripe segments 112L1-112L8, the image color has the greatest weight in the stripe segment 112L8, the second greatest weight in the stripe segment 112R7, and the smallest weight in the stripe segment 112R1. In addition, among the stripe segments 112R1-112R8, the image color has the greatest weight in the stripe segment 112R8, the second greatest weight in the stripe segment 112R7, and the smallest weight in the stripe segment 112R1. That is, both the areas respectively formed by the stripe segments 112L1-112L8 and the stripe segments 112R1-112R8 have gradient color effects so as to blur the boundary of the floating frame 300. Additionally, although in FIG. 6 a number of the stripe segments 112L1-112L8 and a number of the stripe segments 112R1-112R8 are the same (a number of the stripe segments in each of the stereoscopic images 110 is the same) to allow the stripe segments 112L1-112L8 and the stripe segments 112R1-112R8 to generate the same gradient color effect, the claimed scope of the present invention is not limited in this regard. In other embodiments, the numbers of the stripe segments on two opposite sides of the border 200 may be different.

With additional reference to FIG. 2, although the stereoscopic display in FIG. 2 (has two viewing zones) does not have eye detection function in the above embodiment, a stereoscopic display having two viewing zones may have the function of eye detection according to other embodiments. In the stereoscopic display having the eye detection function, the stereoscopic display method may further include:

(5) Detect the distance I between the both eyes L and R of the observer O and the vertical distance D between the both eyes L and R of the observer O and the stereoscopic display panels 100.

(6) Adjust the width W of each of the stripe segments 112L and 112R on two opposite sides of the border 200 based on the distance I between the both eyes L and R of the observer O and the vertical distance D between the both eyes L and R of the observer O and the stereoscopic display panels 100.

As mentioned previously, the width W of each of the stripe segments 112L and 112R is correlated with the vertical distance D, that is, the width W of each of the stripe segments 112L and 112R is inversely proportional to the vertical distance D. Hence, if the stereoscopic display has the function of eye detection, the width W of each of the stripe segments 112L and 112R can be determined based on the vertical distance so as to display the floating frame 300 having a suitable depth of field depending on the position of the observer O.

Figure 7:
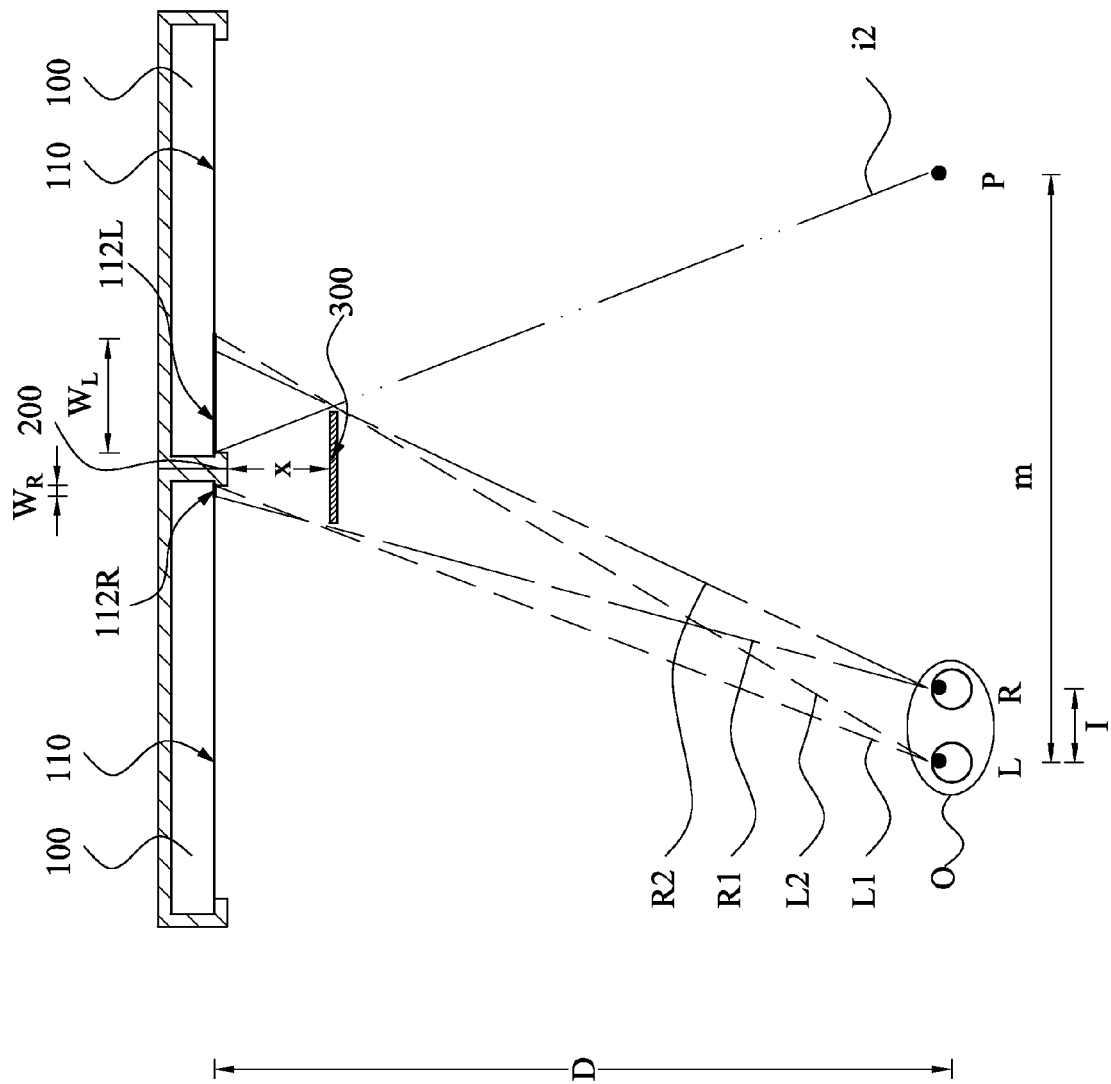
FIG. 7 is a schematic diagram of the stereoscopic display utilizing the stereoscopic display method in FIG. 1 in yet another display state.

The stereoscopic display may further detect the viewing zones where the both eyes L and R of the observer O are located. FIG. 7 is a schematic diagram of a stereoscopic display utilizing the stereoscopic display method in FIG. 1 in yet another display state. In the present embodiment, the stereoscopic display method may further include:

(7) Detect the viewing zones where the both eyes L and R of the observer O are located.

(8) Adjust the width of each of the stripe segments 112L and 112R on two opposite sides of the border 200 respectively based on the viewing zones where the both eyes L and R of the observer O are located.

In greater detail, when the observer O is located at the position shown in FIG. 7, the border 200 and the stripe segment 112L form a left-eye image of the floating frame 300 for the left eye L of the observer O, and a view angle of the left-eye image of the floating frame 300 is between a line segment L1 and a line segment L2. For the right eye R of the observer, the border 200, the stripe segment 112R, and part of the stripe segment 112L form a right-eye image of the floating frame 300, and a view angle of the right-eye image of the floating frame 300 is between a line segment R1 and a line segment R2. In addition, a vertical distance between point P and the stereoscopic display panels 100 is D, a line segment i2 connecting the point P and an edge of the border 200 passes through an edge of the floating frame 300, where a distance between the point P and the left eye L is m. Hence, the width $W_L$ of the stripe segment 112L can be determined based on the two triangles formed by the line segments L2 and i2. According to similar triangle law, it is obtained:

$$\frac{x}{W_L} = \frac{D-x}{m},$$

Hence, $$W_L = \frac{mx}{D-x}.$$

The width $W_R$ of the stripe segment 112R can be determined based on the two triangles formed by the line segments L1 and R1. It is obtained:

$$\frac{x}{W_R} = \frac{D-x}{l},$$

Hence, $$W_R = \frac{xl}{D-x}.$$

In summary, when the stereoscopic display having two viewing zones has eye detection function, the width of each of the stripe segments 112L and 112R can be determined based on the vertical distance D between the both eyes L and R of the observer O and the stereoscopic display panels 100, and/or the viewing zones where the both eyes L and R of the observer O are located. As a result, the stereoscopic display method according to the present embodiment is capable of providing the floating frame 300 having a suitable depth of field depending on the position of the observer O so as to lessen the discomfort in the observer O.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A stereoscopic display method comprising:
    providing a plurality of stereoscopic images by providing a plurality of stereoscopic display panels, at least one border being disposed between two of the stereoscopic display panels adjacent to each other;
    adding at least one stripe segment in each of the stereoscopic images, the stripe segments being adjacent to the border such that the stripe segments and the border form a floating frame when an observer observes the stripe segments and the border using both eyes of the observer; and
    adjusting a width of each of the stripe segments such that a depth of field of the floating frame is substantially the same as a depth of field of the stereoscopic images adjacent to the floating frame.

2. The stereoscopic display method of claim 1, wherein the width of each of the stripe segments substantially satisfies:

$$W = \frac{xl}{D-x},$$

where W denotes the width of each of the stripe segments, x denotes the depth of field of the stereoscopic images adjacent to the border, I denotes a distance between the both eyes of the observer, and D denotes a vertical distance between the both eyes of the observer and the stereoscopic display panels.

3. The stereoscopic display method of claim 1, wherein the border at least comprises a first portion and a second portion, each of the stripe segments comprises a first sub stripe segment and a second sub stripe segment, the first sub stripe segments are adjacent to the first portion of the border, the second sub stripe segments are adjacent to the second portion of the border, each of the stereoscopic images comprises a first part and a second part, when the observer observes the first sub stripe segments and the first portion of the border using the both eyes of the observer, the first sub stripe segments and the first portion of the border form a first sub floating frame, when the observer observes the second sub stripe segments and the second portion of the border using the both eyes of the observer, the second sub stripe segments and the second portion of the border form a second sub floating frame, the first sub floating frame and the second sub floating frame form the floating frame, the first parts of the stereoscopic images are adjacent to the first sub floating frame, and the second parts of the stereoscopic images are adjacent to the second sub floating frame; and wherein adjusting the width of each of the stripe segments comprises:

adjusting a width of each of the first sub stripe segments such that a depth of field of the first sub floating frame is the same as a depth of field of the first parts of the stereoscopic images; and adjusting a width of each of the second sub stripe segments such that a depth of field of the second sub floating frame is the same as a depth of field of the second parts of the stereoscopic images.

4. The stereoscopic display method of claim 3, wherein the width of each of the first sub stripe segments is different from the width of each of the second sub stripe segments.

5. The stereoscopic display method of claim 1, further comprising:

canceling the stripe segment in each of the stereoscopic images when the depth of field of the stereoscopic images adjacent to the floating frame is located on a rear side of the stereoscopic display panels opposite to the both eyes of the observer.

6. The stereoscopic display method of claim 1, wherein a displayed color of each of the stripe segments is substantially the same as a color of the border.

7. The stereoscopic display method of claim 1, wherein adding the stripe segment comprises:

adding the plurality of stripe segments adjacent to each other in each of the stereoscopic images.

8. The stereoscopic display method of claim 7, wherein adding the plurality of stripe segments further comprises:

adjusting a displayed color of each of the stripe segments, and the displayed color being made by mixing a color of the border and an image color of the stereoscopic image adjacent to each of the stripe segments.

9. The stereoscopic display method of claim 8, wherein the displayed color of each of the two stripe segments adjacent to each other is different from each other.

10. The stereoscopic display method of claim 8, wherein the farther the distance between each of the stripe segments and the border is, the greater the weight of the image color is for the displayed colors of the different stripe segments.

11. The stereoscopic display method of claim 7, wherein a number of the stripe segments in each of the stereoscopic images is the same.

12. The stereoscopic display method of claim 1, further comprising:

detecting a distance between the both eyes of the observer and a vertical distance between the both eyes of the observer and the stereoscopic display panels; and adjusting the width of each of the stripe segments on two opposite sides of the border based on the distance between the both eyes of the observer and the vertical distance between the both eyes of the observer and the stereoscopic display panels.

13. The stereoscopic display method of claim 1, further comprising:

detecting viewing zones where the both eyes of the observer are located; and adjusting the width of each of the stripe segments on two opposite sides of the border respectively based on the viewing zones where the both eyes of the observer are located.

* * * * *